(12) United States Patent
Yasaki et al.

(10) Patent No.: US 11,169,071 B2
(45) Date of Patent: Nov. 9, 2021

(54) METHOD FOR ANALYZING SAMPLES AND DEVICE FOR ANALYZING SAMPLES

(71) Applicants: National University Corporation Nagoya University, Aichi (JP); OSAKA UNIVERSITY, Osaka (JP); KYUSHU UNIVERSITY, NATIONAL UNIVERSITY CORPORATION, Fukuoka (JP)

(72) Inventors: Hirotoshi Yasaki, Nagoya (JP); Takao Yasui, Nagoya (JP); Noritada Kaji, Nagoya (JP); Yoshinobu Baba, Nagoya (JP); Tomoji Kawai, Osaka (JP); Satoyuki Kawano, Osaka (JP); Kentaro Doi, Osaka (JP); Takeshi Yanagida, Fukuoka (JP); Mao Fukuyama, Sendai (JP)

(73) Assignees: NATIONAL UNIVERSITY CORPORATION NAGOYA UNIVERSITY, Aichi (JP); OSAKA UNIVERSITY, Osaka (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 285 days.

(21) Appl. No.: 16/340,055

(22) PCT Filed: Oct. 4, 2017

(86) PCT No.: PCT/JP2017/036124
§ 371 (c)(1),
(2) Date: Apr. 5, 2019

(87) PCT Pub. No.: WO2018/066597
PCT Pub. Date: Apr. 12, 2018

(65) Prior Publication Data
US 2020/0033248 A1    Jan. 30, 2020

(30) Foreign Application Priority Data

Oct. 7, 2016  (JP) .............................. JP2016-199331

(51) Int. Cl.
*G01N 15/00*    (2006.01)
*G01N 27/447*   (2006.01)
(Continued)

(52) U.S. Cl.
CPC ..... *G01N 15/1031* (2013.01); *G01N 27/3275* (2013.01); *G01N 27/4473* (2013.01); *G01N 27/44791* (2013.01)

(58) Field of Classification Search
CPC ......... G01N 27/4473; G01N 27/44791; G01N 15/12; G01N 15/1209; G01N 15/1227
See application file for complete search history.

(56) References Cited

U.S. PATENT DOCUMENTS

2011/0311965 A1    12/2011  Maglia et al.
2011/0312518 A1*   12/2011  Davis ............... B01L 3/502761
                                                          506/9

(Continued)

FOREIGN PATENT DOCUMENTS

| WO | 2014/027580 A1 | 2/2014 |
| WO | 2015/083767 A1 | 6/2015 |
| WO | 2016/063858 A1 | 4/2016 |

OTHER PUBLICATIONS

Waseem Asghar, et al., "Electrical fingerprinting, 3D profiling and detection of tumor cells with solid-state micropores," Lab on a Chip, vol. 12, pp. 2345-2352 (2012).

(Continued)

*Primary Examiner* — Alexander S Noguerola
(74) *Attorney, Agent, or Firm* — McDermott Will & Emery LLP

(57) ABSTRACT

In a method for analyzing samples involving the use of a device for analyzing samples, the device for analyzing
(Continued)

samples includes at least a movement part through which a sample moves, and a measurement unit that is formed in a middle of the movement part and that measures a value of an ion current when the sample passes through the movement part. The analysis method includes at least a measurement step for measuring the value of the ion current when the sample passes through the movement part, and a determination step for determining a change over time in a quantity of ions from the value of the ion current measured in the measurement step. The quantity of ions includes a quantity of ions that have leaked from the sample during movement of the sample through the movement part.

20 Claims, 10 Drawing Sheets

(51) Int. Cl.
    *G01N 15/10*    (2006.01)
    *G01N 27/327*    (2006.01)

(56) References Cited

U.S. PATENT DOCUMENTS

2015/0219593 A1    8/2015    Kawai et al.
2016/0216234 A1    7/2016    Stein et al.

OTHER PUBLICATIONS

Taniguchi, Masaki, et al., "Sigle Virus and Bactrin Detection Using Solid-state Nanopore Devices and Machine Learning," ISTR-SANKEN, Osaka University, The Chemical Society of Japan Spring Annual Meeting (CD-ROM) (2016-), Mar. 2016, 96th, 1 G1-31, p. 2, fig.2; with English abstract.
International Preliminary Report on Patentability issued in International Patent Application No. PCT/JP2017/036124, dated Feb. 28, 2019; English translation.

* cited by examiner

METHOD FOR ANALYZING SAMPLES AND DEVICE FOR ANALYZING SAMPLES

CROSS-REFERENCE OF RELATED APPLICATIONS

This application is the U.S. National Phase under 35 U.S.C. § 371 of International Patent Application No. PCT/JP2017/036124, filed on Oct. 4, 2017, which in turn claims the benefit of Japanese Application No. 2016-199331, filed on Oct. 7, 2016, the entire disclosures of which Applications are incorporated by reference herein.

TECHNICAL FIELD

The present invention relates to a method for analyzing samples and a device for analyzing samples, and in particular relates to a method for analyzing samples in which a change over time in a quantity of ions is determined from a value of an ion current when a sample passes through a measurement region of a device for analyzing samples, and to a device for analyzing samples.

TECHNICAL BACKGROUND

Measuring a number and/or size of bacteria, cells, or other biological samples included in a sample, as well as of non-biological samples such as particulate matter (PM), yields information that is valuable for a healthy lifestyle, and requirements have been steadily increasing in recent years for such measurements to be more precise.

Known devices and methods for measuring, inter alia, the size and number of samples include devices and methods in which the samples are passed through fine holes (micropores) formed in a substrate made of silicon, etc., and the size or number of cells is determined from a manner in which a steady-state current flowing inside the fine holes varies with a voltage applied to the fine holes (see Non-patent Document 1).

It is also known that, instead of passing samples through fine holes as in Non-patent Document 1, a method can be adopted in which a sample drive circuit and a measurement circuit are designed as separate circuits by forming a sample-moving channel on a substrate and forming a first measurement channel and a second measurement channel so as to sandwich the sample-moving channel, and detection sensitivity is raised by setting a high voltage for the drive circuit (see Patent Document 1).

PRIOR ARTS LIST

Patent Documents

Patent Document 1: International Publication No. 2016/063858

Non-Patent Documents

Non-patent Document 1: Waseem, A. et al., Lab on a Chip, vol. 12, pp. 2345-2352 (2012)

SUMMARY OF THE INVENTION

Problems to be Solved by the Invention

In the device and method disclosed in Non-patent Document 1, the size and number of samples can be determined by measuring a change in a steady-state current when cells or other samples flow through fine holes. However, it is the size of the samples that is measured in the device and method disclosed in Non-patent Document 1. Therefore, a problem is presented in that, even when different types of samples are used, such as cells or other biological samples, or airborne microparticles or other non-biological samples, the type of sample cannot be identified if the samples are of the same size.

By contrast, in the device and method disclosed in Patent Document 1, a transient current can be read by raising the measurement sensitivity. As a result, the timing at which samples enter and exit the sample-moving channel can be accurately measured, and a surface charge and ductility of the samples can be measured from a passage speed. However, in the method disclosed in Patent Document 1, a problem is presented in that, even when different types of samples are used, it is impossible to identify the samples if the size or surface charge is the same.

The present invention has been contrived in order to solve the aforementioned problems in the prior art. As a result of thoroughgoing investigations, it was newly discovered that, in addition to information obtained from conventional devices and methods, it is possible to analyze whether a sample is a biological sample or a non-biological sample by adopting a method in which a value of an ion current when the sample passes through a measurement unit of a device for analyzing samples is measured, a change over time in a quantity of ions is determined from the measured value of the ion current, and the quantity of ions that have leaked from the sample during movement of the sample through a movement part is also determined during the determination of the change in the quantity of ions.

Specifically, an object of the present invention is to provide a method for analyzing samples and a device for analyzing samples with which it is also possible to determine a quantity of ions that have leaked from a sample.

Means to Solve the Problems

The present invention relates to a method for analyzing samples and a device for analyzing samples as indicated below.
(1) A method for analyzing samples involving use of a device for analyzing samples, wherein:
  a device for analyzing samples includes at least
  a movement part through which a sample moves, and
  a measurement unit that is formed in a middle of the movement part and that measures a value of an ion current when the sample passes through the movement part;
  the method for analyzing samples includes at least
  a measurement step for measuring the value of the ion current when the sample passes through the movement part, and
  a determination step for determining a change over time in a quantity of ions from the value of the ion current measured in the measurement step; and
  the quantity of ions includes a quantity of ions that have leaked from the sample during movement of the sample through the movement part.
(2) The method for analyzing samples according to (1) above, wherein
  the determination step involves determining at least a slope angle from the measured value of the ion current.
(3) The method for analyzing samples according to (2) above, wherein the determination step involves also determining a standard deviation of the slope angle and/or a volume distribution of the sample.

(4) The method for analyzing samples according to (2) above, furthermore including an identification step for comparing the slope angle determined in the determination step and a slope angle determined from pre-measured values of the ion currents of various samples to identify a type of sample.

(4) The method for analyzing samples according to (3) above, furthermore including an identification step for comparing the slope angle, standard deviation of the slope angle, and/or volume distribution of the sample determined in the determination step and a slope angle, standard deviation of the slope angle, and/or volume distribution of the sample determined from pre-measured values of the ion currents of various samples to identify a type of sample.

(6) The method for analyzing samples according to any one of (2)-(5) above, wherein a value obtained by dividing the slope angle by sample volume is used instead of the slope angle.

(7) The method for analyzing samples according to (1) above, wherein the determination step involves using the mathematical model shown below.

(Equations 1)

$$t_2 < t < t_3$$

$$I(t) = I_1 - \frac{4}{3}\pi a^3 \beta + \zeta(1 - e^{-\gamma(t-t_2)}) \quad (3)$$

$$\zeta = \frac{\beta Q_0}{\rho_0} \quad (4)$$

$$\beta = \frac{I_1 - I_2}{\Omega(t_2)} = \frac{3(I_1 - I_2)}{4\pi a^3} \quad (5)$$

(In the equations, I(t) represents the ion current at time t, $I_1$ represents the ion current at $t_1$, and $I_2$ represents the ion current at $t_2$. $\beta$ represents a ratio of a difference between $I_1$ and $I_2$ to a sample volume. The value $\Omega$ represents a volume of the sample entering the movement part, a represents a radius of the sample, $\zeta$ represents the ion current produced by an electric charge leaking from the sample, $\gamma$ represents a speed constant for ions leaking from the sample, $\rho_0$ represents a charge density of a buffer solution, and $Q_0$ represents a charge included in the sample.)

(8) A device for analyzing samples, wherein:

the device includes at least a movement part through which a sample moves, a measurement unit that is formed in a middle of the movement part and that measures a value of an ion current when the sample passes through the movement part, and a determination unit that determines a change over time in a quantity of ions from the value of the ion current measured by the measurement unit; and the quantity of ions includes a quantity of ions that have leaked from the sample during movement of the sample through the movement part.

(9) The device according to (8) above, wherein the determination unit determines at least a slope angle from the measured value of the ion current.

(10) The device according to (9) above, wherein the determination unit also determines a standard deviation of the slope angle and/or a volume distribution of the sample.

(11) The device according to (9) above, furthermore including a storage unit that stores at least a slope angle determined from a pre-measured value of the ion current of a sample, and an identification unit that compares the slope angle determined by the determination unit and the slope angle stored in the storage unit to identify a type of sample.

(12) The device according to (10) above, furthermore including:

a storage unit that stores a slope angle determined from a pre-measured value of the ion current of a sample, a standard deviation of the slope angle, and/or a volume distribution of the sample; and an identification unit that compares the slope angle, standard deviation of the slope angle, and/or volume distribution of the sample determined by the determination unit and a slope angle, standard deviation of the slope angle, and/or volume distribution of the sample stored in the storage unit to identify a type of sample.

(13) The device according to any one of (9)-(12) above, wherein a value obtained by dividing the slope angle by sample volume is used instead of the slope angle.

(14) The device according to (8) above, wherein the determination unit uses the mathematical model shown below.

(Equations 2)

$$t_2 < t < t_3$$

$$I(t) = I_1 - \frac{4}{3}\pi a^3 \beta + \zeta(1 - e^{-\gamma(t-t_2)}) \quad (3)$$

$$\zeta = \frac{\beta Q_0}{\rho_0} \quad (4)$$

$$\beta = \frac{I_1 - I_2}{\Omega(t_2)} = \frac{3(I_1 - I_2)}{4\pi a^3} \quad (5)$$

(In the equations, I(t) represents the ion current at time t, $I_1$ represents the ion current at $t_1$, and $t_2$ represents the ion current at $t_2$. $\beta$ represents a ratio of a difference between $I_1$ and $I_2$ to a sample volume. The value $\Omega$ represents a volume of the sample entering the movement part, a represents a radius of the sample, $\zeta$ represents the ion current produced by an electric charge leaking from the sample, $\gamma$ represents a speed constant for ions leaking from the sample, $\rho_0$ represents a charge density of a buffer solution, and $Q_0$ represents a charge included in the sample.)

(15) The device according to any one of (8)-(14) above, wherein the device includes a drive unit capable of forming an electrical field in the movement part, the drive unit having a voltage application means capable of changing a size of the electrical field.

Advantageous Effects of the Invention

Using the method for analyzing samples and the device for analyzing samples disclosed in the present specification makes it possible to also determine a quantity of ions that have leaked from a sample, making it possible to analyze samples in greater detail than in the prior art.

BRIEF DESCRIPTION OF THE DRAWINGS

FIG. 7A is a conceptual diagram of a case where electrically charged contents Q leak from a sample to the outside when the sample passes through a measurement region, and FIG. 7B is a conceptual diagram of a case where electrically charged contents Q do not leak from a sample such a polystyrene to the outside when the sample passes through the measurement region;

DESCRIPTION OF THE EMBODIMENTS

A method for analyzing samples (also referred to below as the "analysis method") and a device for analyzing samples (also referred to below as the "device") are described below.

A device according to an embodiment may have any configuration as long as the device includes at least a movement part through which a sample moves, a measurement unit that is formed in a middle of the movement part and that measures a value of an ion current during passage of the sample, and a determination unit that determines a change over time in an ion current from the value of the ion current measured by the measurement unit.

Figure 1:
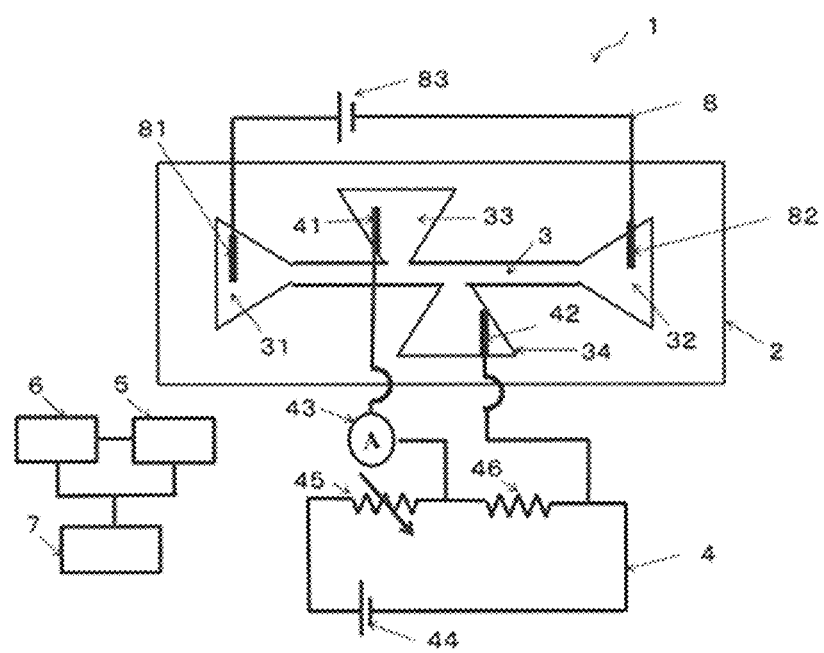
FIG. 1 is a diagram of one example of an embodiment of a device.

FIG. 1 is a diagram of one example of an embodiment of a device. The device 1 shown in FIG. 1 includes at least a substrate 2, a movement part 3 through which a sample formed on the substrate 2 moves, a measurement unit 4 that is formed in a middle of the movement part 3 and that measures a value of an ion current during passage of the sample, and a determination unit 5 that determines a change over time in an ion current from the value of the ion current measured by the measurement unit 4.

In the device 1 shown in FIG. 1, a sample injection part is connected to one end of the movement part 3, and a sample recovery part 32 is connected to another end of the movement part 3. The movement part 3, the sample injection part 31, and the sample recovery part 32 in the embodiment shown in FIG. 1 are channels formed in the substrate 2. The following may also be provided as necessary: a storage unit 6 that stores a mathematical model, a slope angle determined from the value of the ion current of a pre-measured sample, and the like; and an identification unit 7 that identifies a type of sample in accordance with a result of determination by the determination unit 5. A drive unit 8 for applying an electrical field to the movement part 3 also may be provided as necessary. In the device 1 shown in FIG. 1, the drive unit includes a third electrode 81 inserted into the sample injection part 31, a fourth electrode 82 inserted into the sample recovery part 32, and a voltage application means 83.

The measurement unit 4 may include at least a first electrode 41, a second electrode 42, and an ammeter 43. It is preferable that a current from the first electrode 41 and the second electrode 42 be measured by the ammeter 43. It is also possible to adopt a configuration in which only a difference in a measured ion current can be measured by including a voltage application means 44, a variable resistor 45, a fixed resistor 46, and, as necessary, an amplification means in the measurement unit 4 when detection at higher sensitivity is performed by implementing a state in which a balance is established between a voltage of the measurement unit 4 and a voltage of the drive unit 8 for applying an electrical field to the movement part 3, and detecting a difference in current from the balanced state. In the embodiment shown in FIG. 1, the first electrode 41 is inserted into a first measurement channel 33 connected to the movement part 3, and the second electrode 42 is inserted into a second measurement channel 34 connected to the movement part 3 from a side that is opposite from the first measurement channel 33, but it is also possible to form a pair of measuring electrodes so as to sandwich the movement part 3 instead of inserting the first measurement channel 33 and the second measurement channel 34. In such a case, the first electrode 41 and the second electrode 42 of the measurement unit 4 are unnecessary, and it is preferable that the formed measuring electrodes and the ammeter 43 be connected by an electrical wire or the like. As described later, the first measurement channel 33 and the second measurement channel 34 (or the pair of electrodes) are preferably formed at asymmetrical positions sandwiching the movement part 3.

The substrate 2 in which the movement part 3 is formed can be manufactured using a microfabrication technique.

Figure 2:
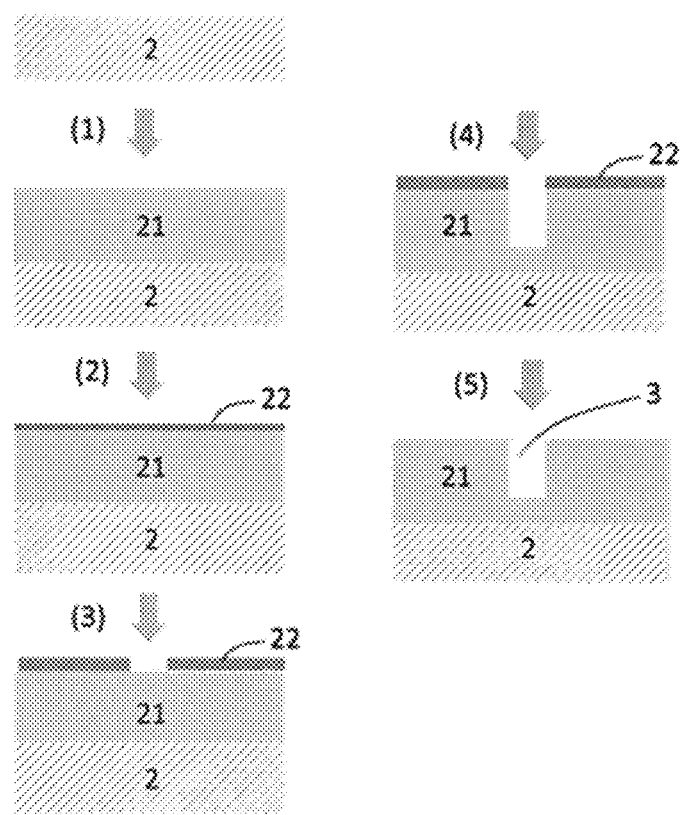
FIG. 2 is a cross-sectional view showing one example of a procedure for manufacturing a device 1.

FIG. 2 is a cross-sectional view showing one example of a procedure for manufacturing the device 1.

(1) An etchable material 21 is formed by chemical deposition on the substrate 2.

(2) A positive photoresist 22 is applied by a spin-coater.

(3) A photomask is used to perform exposure and development treatments such that a location at which the movement part 3 is to be formed is irradiated with light; and a portion of the positive photoresist 22 at which a channel is to be formed is removed.

(4) The material 21 at the location at which the movement part 3 is to be formed is etched, and the movement part (channel) is formed.

(5) The positive photoresist 22 is removed, whereby the movement part 3 is formed on the substrate 2.

The substrate 2 is not limited in any particular way as long as a material typically used in the technical field of semiconductor manufacturing is employed. Examples of the material for the substrate 2 include Si, Ge, Se, Te, GaAs, GaP, GaN, InSb, and InP.

The positive photoresist 22 is not limited in any particular way as long as an article is employed that is typically used in the field of semiconductor manufacturing, such as TSMR-V50 or PMER. Additionally, a negative photoresist may be used instead of the positive photoresist, and the negative photoresist is not limited in any particular way as long as a photoresist is employed that is typically used in the field of semiconductor manufacturing, such as SU-8 or KMPR. A liquid for removing the photoresist is not limited in any particular way as long as a liquid typical in the field of semiconductors is used, such as dimethylformamide or acetone.

The material 21, which is accumulated on the substrate 2 and forms the movement part 3, is not limited in any particular way as long as the material has electrical insulation properties. Examples of the material 21 include $SiO_2$, $Si_3N_4$, BPSG, and SiON. In the manufacturing steps shown in FIG. 2, the movement part 3 is formed using the etchable material 21, but a photosensitive resin such as the positive photoresist or negative photoresist described above may instead be used as the material 21. When a photosensitive resin is used, it is preferable that the photosensitive resin be applied to the substrate 2 and then exposed and developed using a photomask in a shape that enables formation of a movement part, whereby a channel is formed by the photosensitive resin.

In the method shown in FIG. 2, a material different from that of the substrate 2 is accumulated on the substrate 2 and forms the movement part 3, but other methods may also be employed. For example, a substrate that includes a movement part may be integrally formed by a method in which a mold for forming the movement part 3 is produced by a microfabrication technique, and the mold is transferred. Examples of a material by which the mold is transferred include electrically insulated materials such as polydimethylsiloxane (PDMS), polymethyl methacrylate (PMMA), polycarbonate (PC), hard polyethylene, and other plastics. The substrate including the movement part produced by the transfer technique may be affixed to an auxiliary substrate such as a glass or plastic substrate in order to make the substrate more convenient to handle. The substrate including the movement part may be formed using a 3D printer instead of a microfabrication technique.

An electrically conductive material such as aluminum, copper, platinum, gold, silver, titanium, or another such well-known metal is preferably used as the material of the first electrode 41 and the second electrode 42. When measuring electrodes are formed on a substrate side instead of the first electrode 41 and the second electrode 42, it is preferable that these electrodes be produced by forming a mask on the material 21 forming the movement part 3 or on the substrate in which the movement part is integrally formed and depositing the material for the electrodes.

A typically used ammeter is preferably used as the ammeter 43. A DC current is preferably caused to flow through the voltage application means 44, and a well-known DC voltage source is preferably used. For example, a battery or the like may be used. A typically used amplifier is preferably used as the amplification means as well.

When the variable resistor 45 and the fixed resistor 46 are used, detection sensitivity can be increased because a difference in potential in a measurement region in the movement part 3 and a difference in potential at two ends of the fixed resistor 46 can be brought to a balanced state, and a change (change from a steady-state current) in an ion current and generation of a transient current when the sample enters the movement part 3 can be measured as deviations from the balanced state. The term "measurement region" in the present application refers to a portion between the first measurement channel 33 and the second measurement channel 34 (or a portion between the pair of measuring electrodes) in the middle of the movement part 3. The term "transient current" refers to an ion current flowing momentarily through the measurement unit 4, and the term "steady-state current" refers to an ion current flowing steadily through the measurement region. More specifically, manipulating a resistance value of the variable resistor 45 under a constant voltage (a state in which the drive unit 8 is driven) makes it possible to change differences in potential between the fixed resistor 46 and the variable resistor 45. Establishing a balance between the difference in potential in the measurement region in the movement part 3 and the difference in potential at the two ends of the fixed resistor 46 produces a state in which, based on Kirchhoff's laws, no current flows in a circuit that includes the measurement region in the movement part 3, the fixed resistor 46, and the first electrode 41 and second electrode 42. When the sample flows in while in this state, a change in the ion current by the flow of the sample can be measured as a difference from the state in which no ion current flows. Commercially available resistors are preferably used as the variable resistor 45 and the fixed resistor 46.

The determination unit 5 includes a computation means capable of determining a change over time in a quantity of ions (including a quantity of ions that have leaked from the sample) from a value of the ion current measured by the measurement unit 4. In the embodiment shown in FIG. 1, the determination unit 5 and the measurement unit 4 are not linked in a circuit. This is because a value measured by the ammeter 43 may be stored in a storage medium or the like, and the value stored in the storage medium or the like may be determined by the determination unit 5. As shall be apparent, it is possible for the measurement unit 4 and the determination unit 5 to be linked in a circuit and for the value measured by the ammeter 43 to be directly transmitted to and determined by the determination unit 5. Examples of the method for determining the value by the determination unit 5 include methods for determining a slope angle from the value of an ion current, determination methods conducted using a mathematical model of the ion current (also referred to simply as "mathematical model" below) of a sample moving through a channel while a charge is discharged in the sample, and methods in which machine learning is used.

Figure 3:
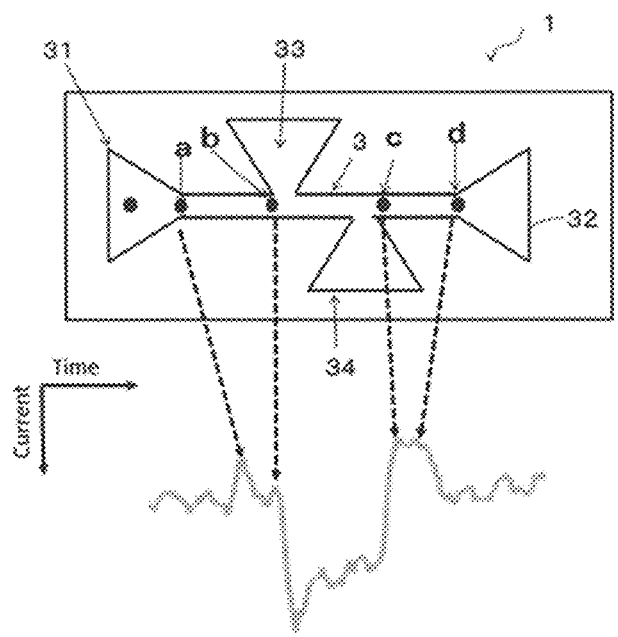
FIG. 3 shows a value (intensity) of an ion current measured using the device 1 shown in FIG. 1.
Figure 4:
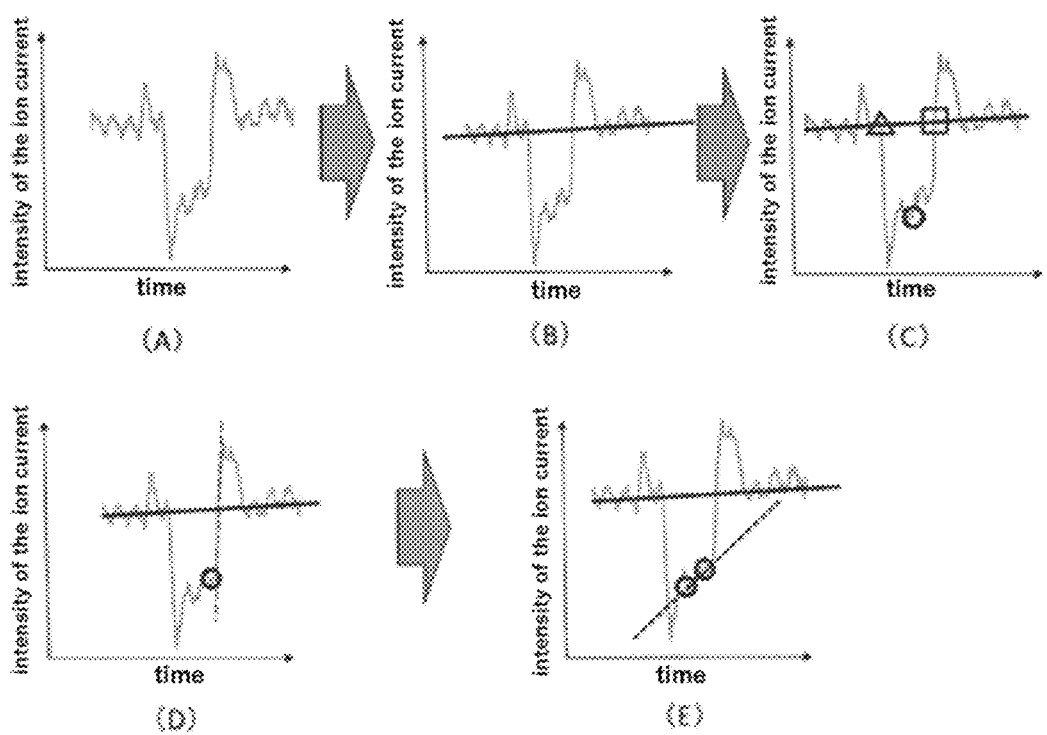
FIG. 4 is a diagram of one example of a method for determining a slope angle from the value of the ion current.
Figure 5:
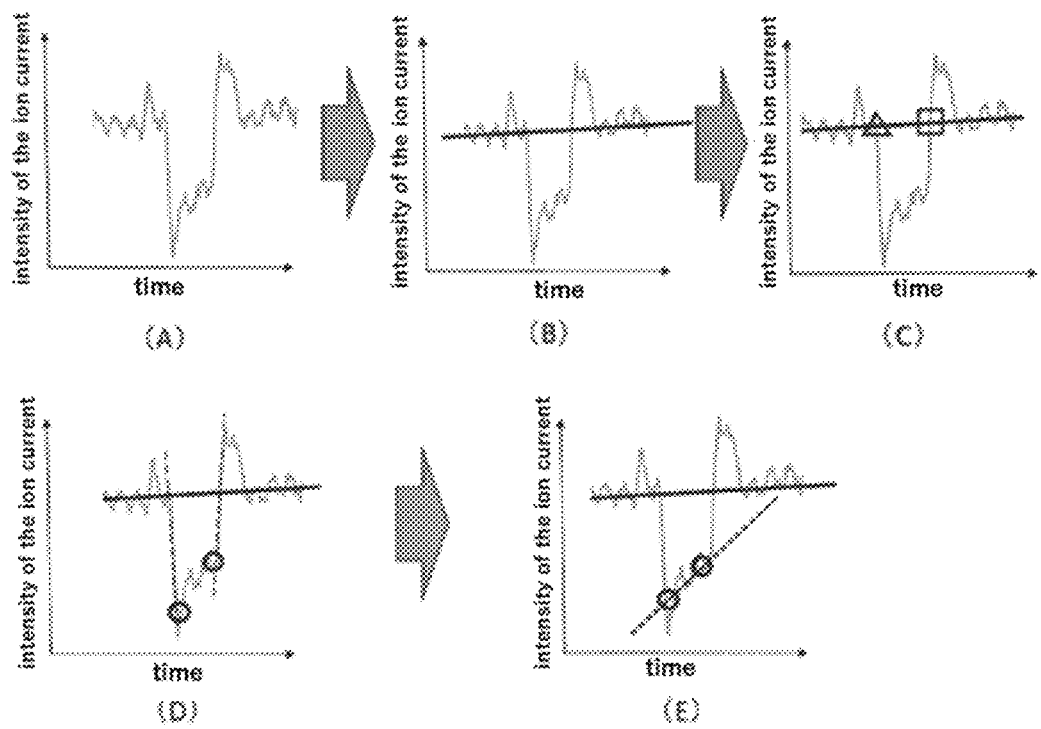
FIG. 5 is a diagram of another example of a method for determining the slope angle from the value of the ion current.

A method for determining a slope angle from the value of an ion current is described using FIG. 3-5. FIG. 3 shows the value (intensity) of the ion current measured using the device 1 shown in FIG. 1.

First, before measurement, a buffer solution such as PBS, a phosphoric acid buffer, or a TBE buffer is guided into a channel by capillary action, and then a sample liquid is injected into the sample injection part 31. A sample then moves toward the sample recovery part 32 when a voltage is applied using the drive unit 8. The measurement unit 4 first measures a transient current when the sample moves near a boundary (position a in FIG. 3) between the sample injection part 31 and the movement part 3. The measurement unit 4 then measures an ion current (steady-state current) until the sample moves from position a to near a connection portion (position b in FIG. 3) between the movement part 3 and the first measurement channel 33. When the sample moves to the measurement region (from position b to position c in FIG. 3), the measurement unit 4 measures a large change in the ion current. The measurement unit 4 subsequently measures the ion current (steady-state current) until the sample moves from position c to near a boundary (position d in FIG. 3) between the movement part 3 and the sample recovery part 32, and then measures the transient current when the sample exits the sample recovery part 32. In the present specification, the phrase "determine a slope angle from a measured value of an ion current" refers to determining a slope angle of a portion in which an ion current has greatly changed when a sample has passed through the measurement region.

FIG. 4 is a diagram of one example of a method for determining the slope angle from the value of the ion current. A specific procedure is as follows.

(A) The value (change in intensity) of the ion current when the sample passes through the movement part 3 is measured.

(B) An approximating line (baseline; straight line in FIG. 4(B)) is computed from the value of the ion current when the sample has passed through a portion of the movement part other than the measurement region.

(C) Computed are a point (the triangle in FIG. 4(C)) at which the baseline intersects a large downward change in the ion current when the sample has entered the measurement region, and a point (the square in FIG. 4(C)) at which the baseline intersects a large upward change in the ion current when the sample has exited the measurement region. A midpoint (midpoint between the triangle and the square on the horizontal axis (time axis); the circle in FIG. 4(C)) between the two computed points is then computed.

(D) An approximating line that approximates the large upward change in the ion current is computed (dashed line in FIG. 4(D)), the approximating line passing through the point (the square in FIG. 4(C)) at which the baseline intersects the large upward change in the ion current when the sample has exited the measurement region. A point at which the intensity of the ion current deviates from the dashed line is then computed (the circle in FIG. 4(D)).

(E) A slope angle of a line (dotted line in FIG. 4(E)) connecting the two circles established in FIGS. 4(C) and 4(D) is computed.

FIG. 5 is a diagram of another example of the method for determining the slope angle from the value of the ion current. The specific procedure is as follows.

(A) The process is the same as in FIG. 4(A).

(B) The process is the same as in FIG. 4(B).

(C) Computed are a point (the triangle in FIG. 5(C)) at which the baseline intersects a large downward change in the ion current when the sample has entered the measurement region, and a point (the square in FIG. 5(C)) at which the baseline intersects a large upward change in the ion current when the sample has exited the measurement region.

(D) An approximating line that approximates the large downward change in the ion current is computed (left-side dashed line in FIG. 5(D)), the approximating line passing through the point (the triangle in FIG. 5(C)) at which the baseline intersects the large downward change in the ion current when the sample has entered the measurement region. A point at which the intensity of the ion current deviates from the dashed line is then computed (the left-side circle in FIG. 5(D)).

In addition, an approximating line that approximates the large upward change in the ion current is computed (right-side dashed line in FIG. 5(D)), the approximating line passing through the point (the square in FIG. 5(C)) at which the baseline intersects the large upward change in the ion current when the sample has exited the measurement region. A point at which the intensity of the ion current deviates from the dashed line is then computed (the right-side circle in FIG. 5(D)).

(E) A slope angle of a line (dotted line in FIG. 5(E)) connecting the two circles established in FIG. 5(D) is computed.

The methods for determining the slope angle from the value of the ion current shown in FIGS. 4 and 5 are merely examples; the slope angle may be determined by other methods. As is indicated in later examples, the determination unit 5 (determination step) may, in addition to determining the slope angle, also determine a standard deviation occurring when the slope angle is determined from individual samples, or to determine a volume distribution of the samples. The slope angle determined using the methods shown in FIGS. 4 and 5 may be used without further modification, or a value obtained by dividing the slope angle by a sample volume may be used. Using the value obtained by dividing the slope angle by the sample volume is useful when there are variations in sample size.

The determination unit 5 may be formed by connecting a personal computer or other type of computer to the device 1, or by incorporating a computation means such as a CPU into the device 1.

Figure 6:
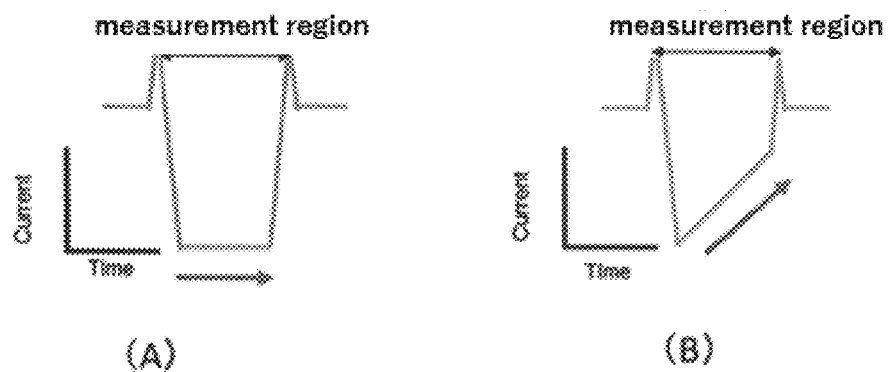
FIG. 6 is a diagram illustrating the principle behind an analysis method.

FIG. 6 is a diagram illustrating the principle behind the analysis method. The drawing shows changes in the intensity of the ion current for a non-biological sample (FIG. 6(A)) and a biological sample (FIG. 6(B)). When the sample passes through the measurement region, a variation width (difference from the baseline) of the intensity of the ion current increases with increased sample size. While the sample is passing through the measurement region, the intensity of the ion current normally stays the same, as shown in FIG. 6(A), as long as the size of the sample does not change. However, the inventors newly discovered that when the sample is a biological sample, the intensity of an ion current changes (has a slope angle) while the sample is passing through the measurement region. It is thought that the reason behind the sloping of the intensity of the ion current when a biological sample passes through the measurement region is that the quantity of ions in a solution filling the movement part 3 changes due to perforations being formed in the sample and the contents of the sample being allowed to leak to the outside by an effect of an electrical field applied to the movement part 3. Therefore, the biological sample that can be analyzed using the device or the analysis method according to the present embodiment is not limited in any particular way as long as perforations are formed by applying a voltage; examples include bacteria, yeasts, and cells.

In conventional devices for measuring microscopic samples, it has come to be regarded as preferable for the measurement region to have a small volume (for the measurement region to be short) in order to measure the samples with greater sensitivity. However, in the device or analysis method according to the present embodiment as shown in FIG. 6, the slope angle of the ion current when the sample passes through the measurement region is determined. Therefore, the measurement region preferably has a prescribed length in order to reduce errors. For example, a length of the measurement region is preferably 40-80, and is more preferably 60-80, where a value of 1 is assigned to a size of the sample to be measured (average particle diameter calculated on the basis of the fact that a difference in a current value between the baseline and the left-side circle in FIG. 5(D) has a proportional relationship with the volume of the particles). When the length is less than 40, the region in which to calculate a slope angle is small and the slope angle is difficult to determine. On the other hand, when the length is greater than 80, a resistance value of the measurement region overall is high and a change in the resistance value when the sample has entered the measurement region is relatively small. This is undesirable because the result is a low downward change in the ion current. The length of the measurement region can be adjusted using the shape of the photomask in the manufacturing steps shown in FIG. 2.

Figure 7:
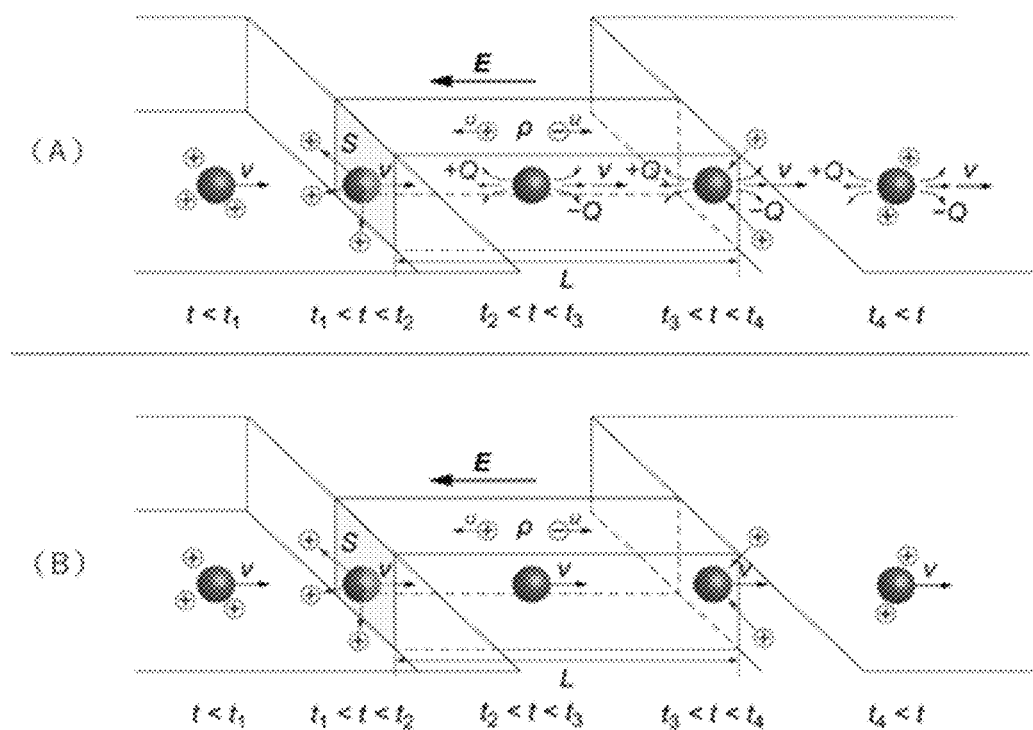
FIG. 7 is a set of conceptual diagrams for a situation when a mathematical model is constructed, where

A determination method in which a mathematical model is used is described next. FIG. 7 is a set of conceptual diagrams for a situation when a mathematical model is constructed. FIG. 7A is a conceptual diagram of a case where electrically charged contents Q leak from a sample to the outside when the sample passes through the measurement region (where L represents the length of the measurement region). FIG. 7B is a conceptual diagram of a case where electrically charged contents Q do not leak from a sample such as polystyrene to the outside when the sample passes through the measurement region. In the drawing, t represents a time axis in which the sample moves through the movement part (measurement region), $t_1$ represents a time at which a leading part of the sample reaches the measurement region, $t_2$ represents a time at which a trailing part of the sample reaches the measurement region, $t_3$ represents a time at which the leading part of the sample reaches an exit of the measurement region, and $t_4$ represents a time at which the trailing part of the sample reaches the exit of the measurement region.

A mathematical model is constructed for, inter alia, an ion current within $t_1 < t < t_2$ and $t_2 < t < t_3$, consideration being given in a comprehensive manner to an equation of motion for when electrically charged particles move at a constant speed v in a buffer solution in which an electrical field is present, to a density of an ion current in the measurement region (cross-sectional area S, length L), to a charge quantity Q at time t, and the like.

(Equations 3)

$$t_1 < t < t_2$$

$$I(t) = I_1 - \beta \Omega(t) \quad (1)$$

-continued $$\Omega(t) = \pi \left[ av^2(t-t_1)^2 - \frac{v^3(t-t_1)^3}{3} \right] \quad (2)$$

$$t_2 < t < t_3$$

$$I(t) = I_1 - \frac{4}{3}\pi a^3 \beta + \zeta(1 - e^{-\gamma(t-t_2)}) \quad (3)$$

$$\zeta = \frac{\beta Q_0}{\rho_0} \quad (4)$$

$$\beta = \frac{I_1 - I_2}{\Omega(t_2)} = \frac{3(I_1 - I_2)}{4\pi a^3} \quad (5)$$

(In the equations, I(t) represents the ion current at time t, $I_1$ represents the ion current at $t_1$, and $I_2$ represents the ion current at $t_2$. β represents a ratio of a difference between $I_1$ and $I_2$ to a sample volume. The value Ω represents a volume of the sample entering the movement part, a represents a radius of the sample, v represents a movement speed of the sample passing through the movement part, ζ represents the ion current by an electric charge leaking from the sample, γ represents a speed constant for ions leaking from the sample, $\rho_0$ represents a charge density of the buffer solution, and $Q_0$ represents a charge included in the sample.)

In the equations above, $t_1$, $t_2$, $I_1$, and $I_2$ are actual measured values; a and $\rho_0$ are constants; v, β, and ζ are calculated values obtained by substituting the actual measured values and constants into the mathematical model; and γ and $Q_0$ are variables.

In the present specification, when a "mathematical model" is described, this term refers to at least equations (3) to (5) above; equations (1) and (2) also may be added as necessary. The determination unit (determination step) makes a determination through the following procedures using the mathematical model described above.

The actual measured values $t_1$, $t_2$, $I_1$, and $I_2$ obtained during actual tests are substituted into equations (3) to (5). The radius (a) of the sample used and the charge density of the buffer solution are also substituted into equations (3) to (5).

The values v, β, and ζ are calculated by substituting the values above into the mathematical model. In the present embodiment, data in $t_2 < t < t_3$ is determined through the mathematical model, but when the movement speed v of the sample is established from data in $t_1 < t < t_2$, the value of v is preferably determined by substituting the actual measured values of $I_1$ and $I_2$ into equations (1) and (2).

The variable γ in equation (3) and the variable $Q_0$ in equation (4) are adjusted and γ and $Q_0$ values are established at which equation (3) above and the measured values of the ion current are made to fit in an interval of $t_2 < t < t_3$ by the least-squares method.

It can be assumed that amounts of ions that leak from samples are the same for samples of the same type. By contrast, it can be assumed that amounts of ions that leak from samples are different for samples of different types. Therefore, the values of γ and $Q_0$ at which least-squares fitting is achieved in the interval of $t_2 < t < t_3$ are also different for samples of different types. Accordingly, it is possible to identify sample types by comparing the values of γ and $Q_0$.

A determination method in which machine learning is used is described next. Analysis in which machine learning is used is preferably conducted by a method in which a plurality of values of ion currents measured from samples of the same type are prepared, an identifying reference or the like for identifying the samples is extracted using a well-known machine learning procedure, and an algorithm is developed. For example, International Publication No. 2017/110753, Japanese Patent Application Kokai Publication No. 2017-120257, etc., can be referred to for methods of using machine learning on measured values of ion currents.

The storage unit 6 is not limited in any particular way as long as determined slope angles can be stored therein together with the following optional items: standard deviations of the slope angle, volume distributions of samples, values obtained by dividing the slope angle by the sample volume, and the like; values such as the variables $\gamma$ and $Q_0$ that correspond to the sample type and the mathematical model; algorithms for machine learning; and the like. A well-known volatile memory, non-volatile memory, or the like is preferably used.

The identification unit 7 is not limited in any particular way as long as it is possible to compare a determination result determined by the determination unit 5 and data stored in the storage unit 6 to identify types of samples. A CPU is an example of an identification unit. For example, the type of sample is preferably identified by comparing a slope angle determined by the determination unit 5 and a slope angle stored in the storage unit 6. The identification unit 7 may identify samples as needed on the basis of a standard deviation of the slope angle, a volume distribution of a sample, a value obtained by dividing the slope angle by the sample volume, etc. When a determination is made on the basis of a mathematical model, types of samples are preferably identified by comparing the determined variables $\gamma$, $Q_0$ and the variables $\gamma$, $Q_0$ stored in the storage unit 6. When a determination is made on the basis of machine learning, it is preferable that measured values of ion currents be determined by a machine learning algorithm stored in the storage unit 6, and types of measured samples be identified by the identification unit 7.

The third electrode 81 and the fourth electrode 82 of the drive unit 8 are preferably formed from the same material as the first electrode 41 and the second electrode 42. Additionally, it is preferable that the same DC voltage source as that for the voltage application means 44 of the measurement unit 4 also be used for the voltage application means 83 included in the drive unit 8. As described above, it is considered that applying a voltage to a biological sample forms perforations in the biological sample. In the drive unit 8 shown in FIG. 1, the third electrode 81 is inserted into the sample injection part 31, and the fourth electrode 82 is inserted into the sample recovery part 32. Therefore, applying a voltage to the movement part 3 by the voltage application means 83 yields an action by which a sample injected by the force received by the sample from an electric field is transported (caused to migrate) from the sample injection part 31 to the sample recovery part 32, as well as an action by which perforations are formed in the sample in the case of a biological sample. The voltage application means 83 of the drive unit 8 may be capable of adjusting the magnitude of the voltage applied. A commercially available DC voltage source that allows voltage adjustment may be used as the adjustable voltage application means 83, and a plurality of batteries are preferably connected in series when a battery is used. Adjusting the voltage is believed to make it possible to adjust the extent to which perforations are formed in a biological sample. An orientation (positive and negative orientation) of the voltage application means 83 in the drive unit 8 is not limited to the direction shown in FIG. 1; the orientation may be set to an opposite direction in accordance with a surface charge of the sample. Alternatively, the orientation of the voltage application means 83 may be fixed, the sample recovery part 32 may be used as a sample injection part, and the sample injection part 31 may be used as a sample recovery part. When the orientation of the voltage application means 83 is opposite the orientation shown in FIG. 1, it is preferable that the orientation of the voltage application means 44 also be reversed in order to implement a state in which a balance is established between a difference in potential in the measurement region in the movement part 3 and a difference in potential at the two ends of the fixed resistor 46.

The drive unit 8 shown in FIG. 1 can simultaneously perform the two actions of driving a sample and perforating the sample, and therefore constitutes a preferred mode, but the drive unit is not limited in any particular way as long as the sample can move through the movement part 3 and be perforated. For example, a biological sample can be perforated in the measurement region by allowing the sample to move through the movement part 3 using a syringe pump or the like, and forming an electrode for applying a voltage to the measurement region.

It is presumed with regard to the buffer solution in which the sample is dispersed that if a concentration of the sample is too high, a measurement value of the ion current will not be a true reflection of the result even if the biological sample is perforated and the contents leak to the outside. Therefore, the concentration of the buffer solution is preferably kept as low as possible or otherwise appropriately adjusted within a range that exhibits an action of moving the injected sample from the sample injection part 31 to the sample recovery part 32.

Figure 8:
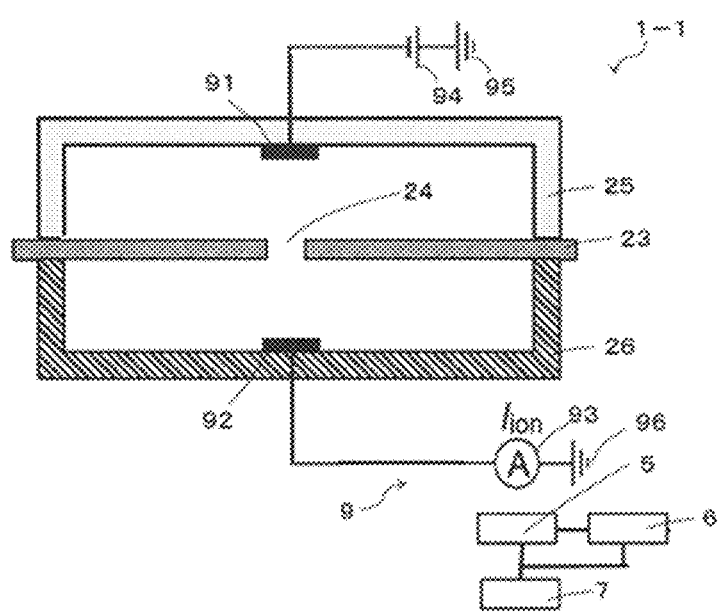
FIG. 8 is a diagram of another example of an embodiment of a device.

FIG. 8 is a diagram of another example of an embodiment of a device. In FIG. 8, the same reference signs as in FIG. 1 refer to constituent elements having the same function. In a device 1-1 shown in FIG. 8, a through-hole (nanopore) 24 that corresponds to a measurement region is formed in a substrate 23, and a movement part 3 is formed from a first chamber member 25 and a second chamber member 26, instead of the movement part 3 (channel) being formed in the substrate 2. In the first chamber member 25, a first chamber to be filled with a buffer solution can be formed from a surface that includes at least the through-hole 24 on one side of the substrate 23. In the second chamber member 26, a second chamber to be filled with the buffer solution can be formed from a surface that includes at least the through-hole 24 on another side of the substrate 23. The device 1-1 furthermore includes at least a measurement unit 9 and a determination unit 5. A storage unit and an identification unit 7 may also be provided as necessary. In the embodiment shown in FIG. 8, the determination unit 5 and the measurement unit 9 are not connected in a circuit. However, the determination unit 5 and the measurement unit 9 may be connected in a circuit in the same manner as in the embodiment shown in FIG. 1.

The first chamber member 25 and the second chamber member 26 are preferably formed from an electrically and chemically inert material. Examples include glass, sapphire, ceramics, resin, rubber, elastomers, $SiO_2$, SiN, and $Al_2O_3$.

The first chamber member 25 and the second chamber member 26 are formed so as to sandwich the through-hole 24 and are formed such that a sample injected into the first chamber is capable of moving through the through-hole 24 into the second chamber. Holes (not shown) for filling/discharging a buffer solution and a sample liquid and for inserting an electrode and/or a lead may be formed as necessary in the first chamber member 25 and the second chamber member 26.

The measurement unit 9 includes at least a fifth electrode 91 formed in a location that contacts the buffer solution in the first chamber, a sixth electrode 92 formed in a location that contacts the buffer solution in the second chamber, and an ammeter 93. A material forming the fifth electrode 91 and the sixth electrode 92 may be the same as that forming the first electrode 41 and the second electrode 42. The fifth electrode 91 and the sixth electrode 92 are formed so as to sandwich the through-hole 24, and ions are transported in the buffer solution by application of a DC current. Therefore, the fifth electrode 91 is preferably formed in a location that contacts the buffer solution in the first chamber, and is preferably disposed on the substrate 23, on an inner surface of the first chamber member 25, or in a space inside the first chamber via a lead. The sixth electrode 92, similar to the fifth electrode 91, is preferably formed in a location that contacts the buffer solution in the second chamber, and is preferably disposed on the substrate 23, on an inner surface of the second chamber member 26, or in a space inside the second chamber via a lead. In the example shown in FIG. 8, the fifth electrode 91 is formed on an inner surface of the first chamber member 25, and the sixth electrode 92 is formed on an inner surface of the second chamber member 26; however, the fifth electrode 91 and the sixth electrode 92 may be inserted from holes formed in the first chamber member 25 and the second chamber member 26.

The fifth electrode 91 is connected to a power supply 94 and ground 95 via a lead. The sixth electrode 92 is connected to the ammeter 93 and ground 96 via a lead. In the example shown in FIG. 8, the power supply 94 is connected to the fifth electrode 91, and the ammeter 93 is connected to the sixth electrode 92, but the power supply 94 and the ammeter 93 may be provided to the same electrode.

The power supply 94 is not limited in any particular way as long as it is possible to energize the fifth electrode 91 and the sixth electrode 92 with a DC current; the same DC voltage source as that for the voltage application means 83 is preferably used. The ammeter 93 is not limited in any particular way as long as the generated ion current can be measured over time when the fifth electrode 91 and the sixth electrode 92 are energized, and similar to the ammeter 43, a commercially available ammeter is preferably used. A noise reduction circuit, a voltage stabilizing circuit, or the like (not shown in FIG. 8) may also be provided as necessary.

When the sample passes through the through-hole 24 in the device 1-1, the ion current flowing through the through-hole 24 is blocked by the sample and is reduced, changing in the same manner as in FIG. 3. The change over time in the ion current is preferably determined by the determination unit 5 in the same manner as described above. In the device shown in FIG. 8, the through-hole 24 corresponds to the measurement region for determining the change over time in the quantity of ions. A length of the substrate 23 is preferably adjusted as appropriate in order to achieve an expected length of the measurement region.

The device 1-1 differs from the device 1 in that the measurement unit 9 also fulfills a role of a drive unit, therefore making it possible to measure the value of the ion current even when no separate drive unit is provided. As shall be apparent, it is possible for the drive unit and the measurement unit to be provided separately in the device 1-1 as well. In such a case, the first electrode 41 and the second electrode 42 of the measurement unit 4 are preferably provided so as to sandwich the through-hole 24 in the same manner as in FIG. 1, the third electrode 31 of the drive unit 8 is preferably formed in a portion of the first chamber other than the through-hole 24, and the fourth electrode 82 is preferably formed in a portion of the second chamber other than the through hole 24.

The substrate 23 is not limited in any particular way as long as an electrically insulated material typically used in the field of semiconductor manufacturing is employed. Examples include Si, Ge, Se, Te, GaAs, GaP, GaN, InSb, InP, and SiN. The substrate 23 may be formed in a thin-film shape referred to as a solid membrane using SiN, $SiO_2$, $HfO_2$, or another such material, or in a sheet shape referred to as a two-dimensional material using graphene, graphene oxide, molybdenum dioxide ($MoS_2$), boron nitride (BN), or another such material. The through-hole 24 is preferably formed by drawing a portion for forming the through-hole 24 by electron beam lithography, performing reactive ion etching, or the like.

Figure 9:
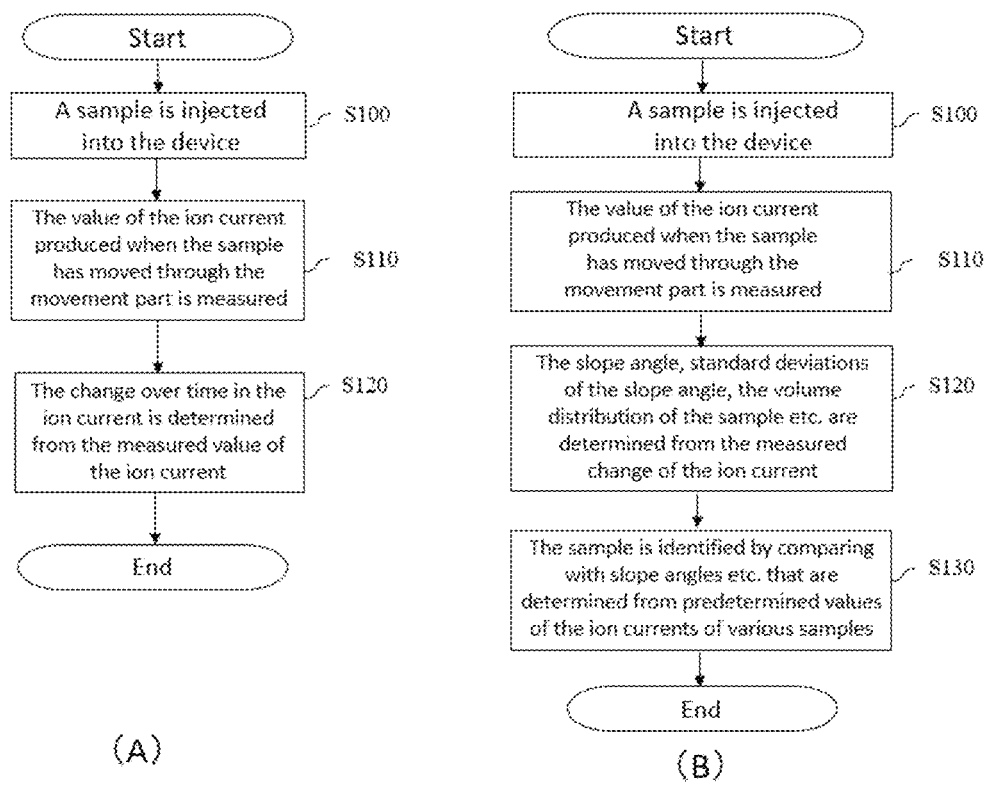
FIGS. 9(A) and 9(B) are flow charts showing examples of a procedure in a method for analyzing samples.

FIG. 9(A) is a flow chart showing one example of a procedure in a method for analyzing samples.

1. A sample dispersed in a buffer solution is injected into the device 1 (1-1) (S100).
2. The value of the ion current when the sample has moved through the movement part is measured (S110).
3. The change over time in the ion current (e.g., the slope angle, or a variable for which the mathematical model is used) is determined from the measured value of the ion current (S120).

Whether the sample is a biological sample or a non-biological sample can be identified from the change over time in the quantity of ions determined through the steps described above.

FIG. 9(B) is a flow chart showing another example of a procedure in a method for analyzing samples. In the procedure shown in FIG. 9(B), 3. In (S120), the slope angle is determined as the change over time, and in addition to the slope angle being determined, there are also determined as necessary standard deviations of the slope angle, the volume distribution of the sample, and a value obtained by dividing the slope angle by the sample volume.
4. The slope angle, standard deviations of the slope angle, volume distribution of the sample, and value obtained by dividing the slope angle by the sample volume that are determined as described above are compared with slope angles, standard deviations of the slope angles, volume distributions of samples, and values obtained by dividing the slope angles by the sample volume that are determined from the predetermined values of the ion currents of various samples; and the type of sample is identified (S130).

As indicated in examples described later, the standard deviations of the slope angle, the volume distributions of samples, and other such parameters differ in accordance with the type of sample. Therefore, the type of biological sample can also be identified in the analysis method shown in FIG. 9(B). The type of biological sample can moreover be identified in the method for establishing the variables γ, $Q_0$ using the mathematical model and in the method in which machine learning is used.

Embodiments of the present invention are specifically described through use of the following examples. These examples are provided for the purpose of referring to specific modes. These illustrative examples in no way limit or restrict the scope of the invention disclosed in the present application.

(Production of Device 1)

Example 1

The device 1 was produced through the following procedure.

(1) A silicon substrate 2 (manufactured by Ferrotec; diameter: 76 mm) having a thickness of 600 μm was prepared.

(2) A negative photoresist SU-8 3005 (manufactured by Micro Chem Corp.) was applied by a spin-coater.

(3) A photomask was used for exposure through photolithography such that a location where the movement part was to be formed was irradiated with light. After exposure, the resist was developed using SU-8 developer (manufactured by Micro Chem Corp.). The resist was rinsed using ultrapure water after development and was dried by flinging off moisture in a spin dryer, and a mold was produced.

(4) Polydimethylsiloxane (SILPOT 184 manufactured by Toray Industries Inc.) was poured into the mold thus produced and then was cured.

Figure 10:
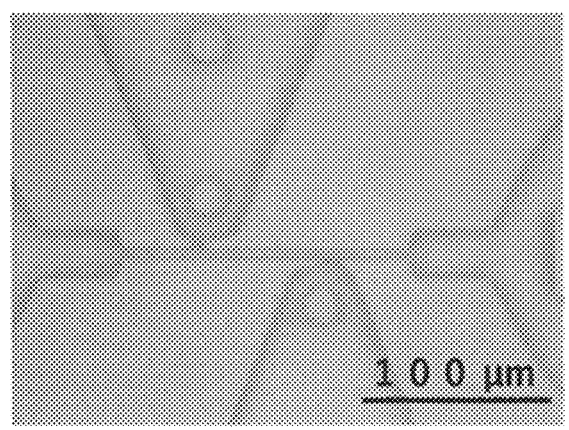
FIG. 10 is a photograph in lieu of a drawing, and is a photograph of a substrate produced in Example 1.

(5) The cured PDMS was removed from the mold, and then commercially available cover glass (thickness: 0.17 mm) was bonded to the PDMS. FIG. 10 is a photograph of a substrate produced in this manner; in the substrate, the movement part 3 had a length of 150 μm, a width of 3.0 μm, and a depth of 8.2 μm. A depth of the first measurement channel 33 and the second measurement channel 34 was 8.2 μm, a length of a connection portion between the measurement channels and the movement part was 3.0 μm, and an angle between the first measurement channel 33 and the movement part 3 was approximately 60°. A positional displacement between the first movement channel 33 and the second movement channel 34 sandwiching the movement part 3 (i.e., a length between an end part of the first measurement channel 33 and an end part of the second measurement channel 34) was 80 μm. The depth of the sample injection part 31 and the sample recovery part 32 was 8.2 μm.

(6) The drive unit 8 was then produced. The third electrode 81 and the fourth electrode 82 were produced by stripping a sheath of an electrical wire (FTVS-408 manufactured by Oyaide Electric Co., Ltd.) to expose a metal portion. A battery box (manufactured by Seinan Kogyo Corp.) having batteries inserted therein was used as the voltage application means 83. The third electrode 81 was inserted into the sample injection part 31, and the fourth electrode 82 was inserted into the sample recovery part 32.

(7) The measurement unit 4 was then produced. The first electrode 41 and the second electrode 42 were produced by stripping a sheath of an electrical wire (FTVS-408 manufactured by Oyaide Electric Co., Ltd.) to expose a metal portion. A variable-gain low-noise current amplifier (manufactured by FEMTO) was used as the amplification means. A battery box (manufactured by Seinan Kogyo Corp.) having batteries inserted therein was used as the voltage application means 44. A precise potentiometer (manufactured by BI Technologies) was used as the variable resistor 45. In the ammeter 43, a signal amplified by the amplification means was converted to an electrical signal for a PC using a USB-DAQ (manufactured by National Instruments) and then read by software produced using LabView (manufactured by National Instruments). A metal-film resistor (1 kΩ; manufactured by Panasonic Corp.) was used as the fixed resistor 46. The first electrode 41 was inserted into the first measurement channel 33, and the second electrode 42 was inserted into the second measurement channel 34.

(Measurement 1 in which Device 1 is Used: Comparison of Sample with Non-Sample)

Example 2

*Staphylococcus aureus* (ATCC 700699) and fluorescent microbeads (Fluoresbrite manufactured by Polyscience) were dispersed into a 5×TBE buffer (a buffer obtained by dissolving Tiris manufactured by Life Technologies Corp., boric acid manufactured by Wako, and EDTA manufactured by Wako in pure water so as to reach 0.45 M, 0.45 M, and 0.01 M, respectively) to produce a mixed sample liquid including a non-biological sample and a biological sample. The *Staphylococcus aureus* was dyed by adding FM 1-43 membrane dye (manufactured by Thermo Fischer Scientific Inc.) to the mixed sample liquid. A size of the *Staphylococcus aureus* and the fluorescent microbeads was substantially the same (approximately 1 μm in diameter). The 5×TBE buffer was then guided into the movement part (channel) by capillary action, μL of the produced sample liquid was injected into the sample injection part 31, and a voltage of 50V was applied to the drive unit 8. Additionally, a voltage of 18V was applied to the measurement unit 4. The variable resistor 45 was manipulated to implement a state in which a balance was established between apparent resistances of the drive unit 8 and the measurement unit 4, and the value of the ion current when the sample moved through the movement part 3 was measured.

Figure 11:
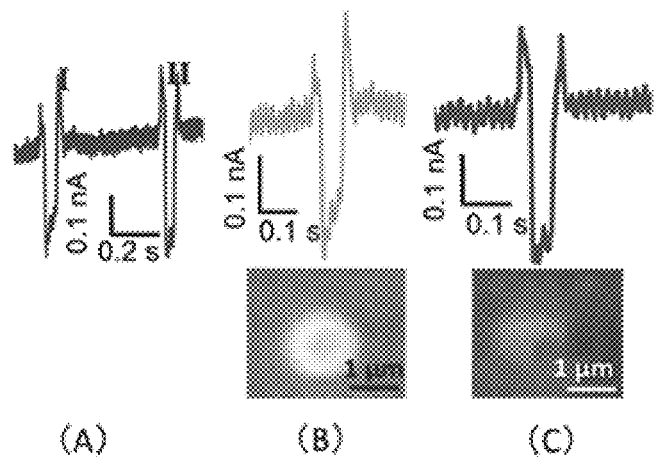
FIG. 11(A) shows raw data of values of an ion current measured in Example 2.
FIG. 11(B) shows values of an ion current for *Staphylococcus aureus*.
FIG. 11(C) shows values of an ion current for fluorescent microbeads.
FIG. 11(D) shows values of an ion current in which twenty measurement results from FIGS. 11(B) and 11(C) are superposed.
Figure 11:
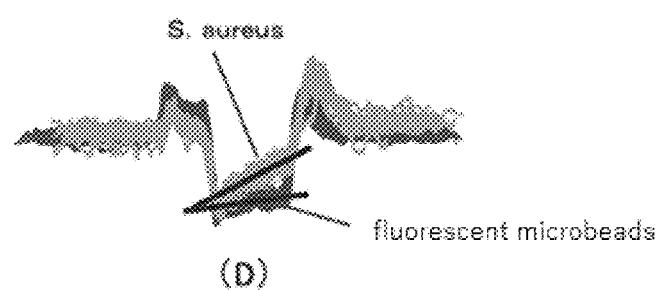

FIG. 11(A) shows raw data of measured values of the ion current, FIG. 11(B) shows values of an ion current for *Staphylococcus aureus*, and FIG. 11(C) shows values of an ion current for fluorescent microbeads. FIG. 11(B) also shows a fluorescent-microscope photograph of *Staphylococcus aureus*, and FIG. 11(C) also shows a fluorescent-microscope photograph of the fluorescent microbeads. Signals generated when the sample passes through the measurement region were measured while it is confirmed whether the signals were from the *Staphylococcus aureus* or the fluorescent microbeads by observation using a fluorescent microscope simultaneously with measurement. FIG. 11(D) shows values of an ion current in which twenty measurement results from FIGS. 11(B) and 11(C) are superposed. As shall be apparent from FIG. 11(D), it was confirmed that the slope angle obtained when the sample passes through the measurement region obviously differs between the non-biological sample (fluorescent microbeads) and the biological sample (*Staphylococcus aureus*).

(Measurement 2 in which Device 1 is Used: Comparison of Biological Samples)

Example 3

The value of the ion current was measured in the same manner as in Example 2, except that the bacteria listed below were used as samples. Twenty measurement results were superposed for each of these bacteria.

(A) *Staphylococcus epidermidis* (ATC 14990)

(B) The same *Staphylococcus aureus* as in Example 2 (unstained in the present example)

(C) Sterilized (thermally denatured) *Staphylococcus aureus* (the *Staphylococcus aureus* was heated at 120° C. for 20 minutes using an autoclave)

Figure 12:
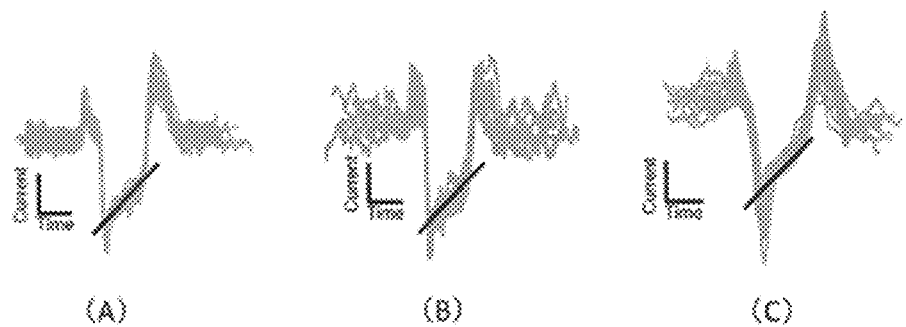
FIG. 12(A) shows measurement results for *Staphylococcus epidermidis*.
FIG. 12(B) shows measurement results for *Staphylococcus aureus*.
FIG. 12(C) shows measurement results for thermally denatured *Staphylococcus aureus*.

FIG. 12(A) shows measurement results for *Staphylococcus epidermidis*, FIG. 12(B) shows measurement results for *Staphylococcus aureus*, and FIG. 12(C) shows measurement results for thermally denatured *Staphylococcus aureus*. The results in FIG. 12(A)-(C) showed a slope angle for the ion current during passage through the measurement region irrespective of the state of the bacteria (live or sterilized). It is obvious from this result that a biological sample can be differentiated from a non-biological sample irrespective of whether the biological sample is in a living state.
(Measurement 3 in which Device 1 is Used: Example of Data Analysis)

Example 4

Figure 13:
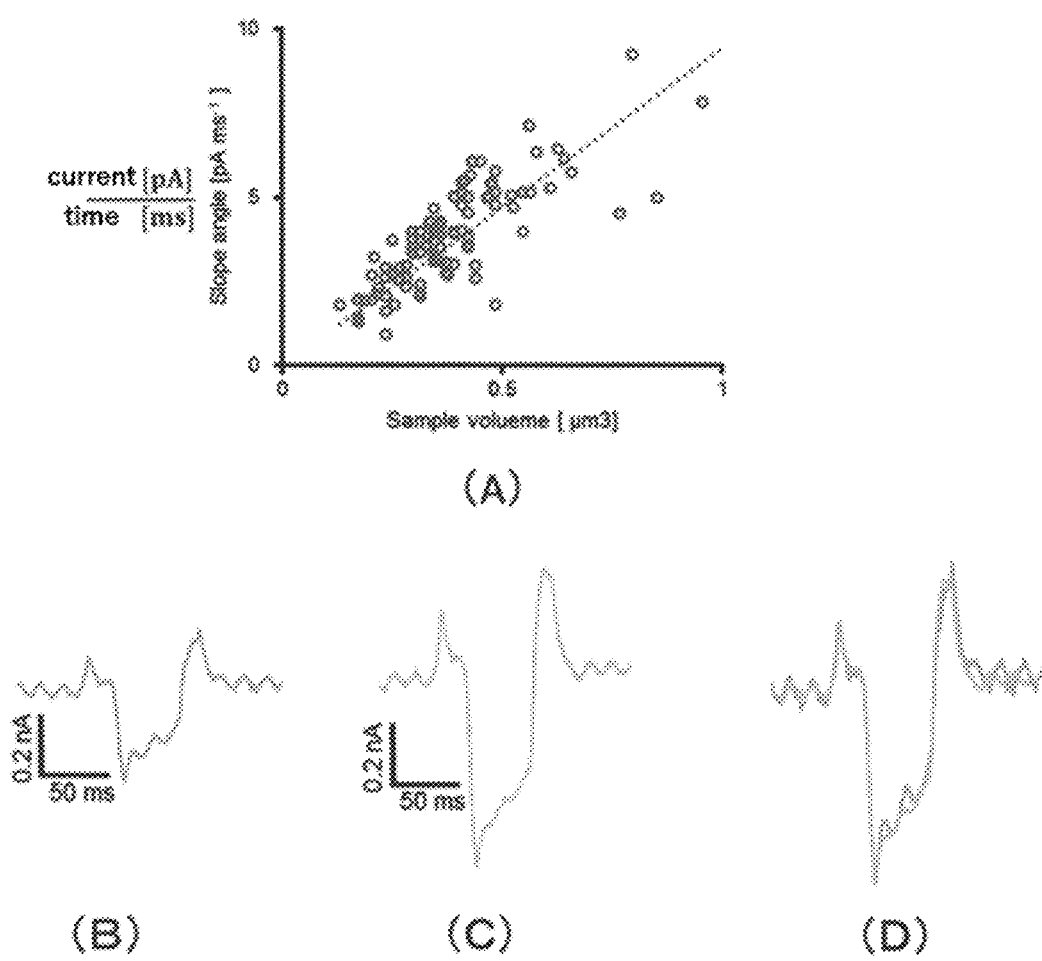
FIG. 13(A) is a graph in which a volume of *Staphylococcus aureus* measured in Example 2 is plotted on a horizontal axis and a ratio of current (pA) to time (ms) is plotted on a vertical axis.
FIGS. 13(B) and 13(C) show measurement results for the ion current in a case of different bacteria sizes.
FIG. 13(D) shows that the results shown in FIGS. 13(B) and 13(C) can be compared by dividing a slope angle by the volume.

FIG. 13(A) is a graph in which a volume of *Staphylococcus aureus* measured in Example 2 is plotted on a horizontal axis and a ratio of current (pA) to time (ms) is plotted on a vertical axis. The volume on the horizontal axis is a value computed on the basis of the fact that a difference in a current value between the baseline and the left-side circle in FIG. 5(D) has a proportional relationship with the volume of particles. The slope angle on the vertical axis is a value established in the procedure shown in FIG. 4, and "the ratio of current (pA) to time (ms)" represents a unit of the slope angle (change in current value per unit time). Therefore, it was obvious that dividing the slope angle by the volume makes it possible to compare results in the same manner as shown in FIG. 13(D) even when the sizes of the bacteria differ, as shown in FIGS. 13(B) and 13(C).
(Measurement 4 in which Device 1 is Used: Identification of Various Bacteria)

Example 5

The bacteria listed below were used as samples.
(A) The same *Staphylococcus epidermidis* as in Example 3. Gram-positive. Coccoid bacteria.
(B) The same *Staphylococcus aureus* as in Example 3. Gram-positive. Coccoid bacteria.
(C) *Bacillus subtilis* (ATCC 6633). Gram-positive. Bacilliform bacteria.
(D) *Escherichia coli* (JM109 manufactured by Takara Bio Inc.). Gram-negative. Bacilliform bacteria.

The value of the ion current was measured for each of the samples using the same procedure as in Example 2. The slope angle was determined for each of the bacteria using the procedure shown in FIG. 4, with the volume of the sample plotted on a horizontal axis and a (slope angle/sample volume) ratio plotted on a vertical axis.

Figure 14:
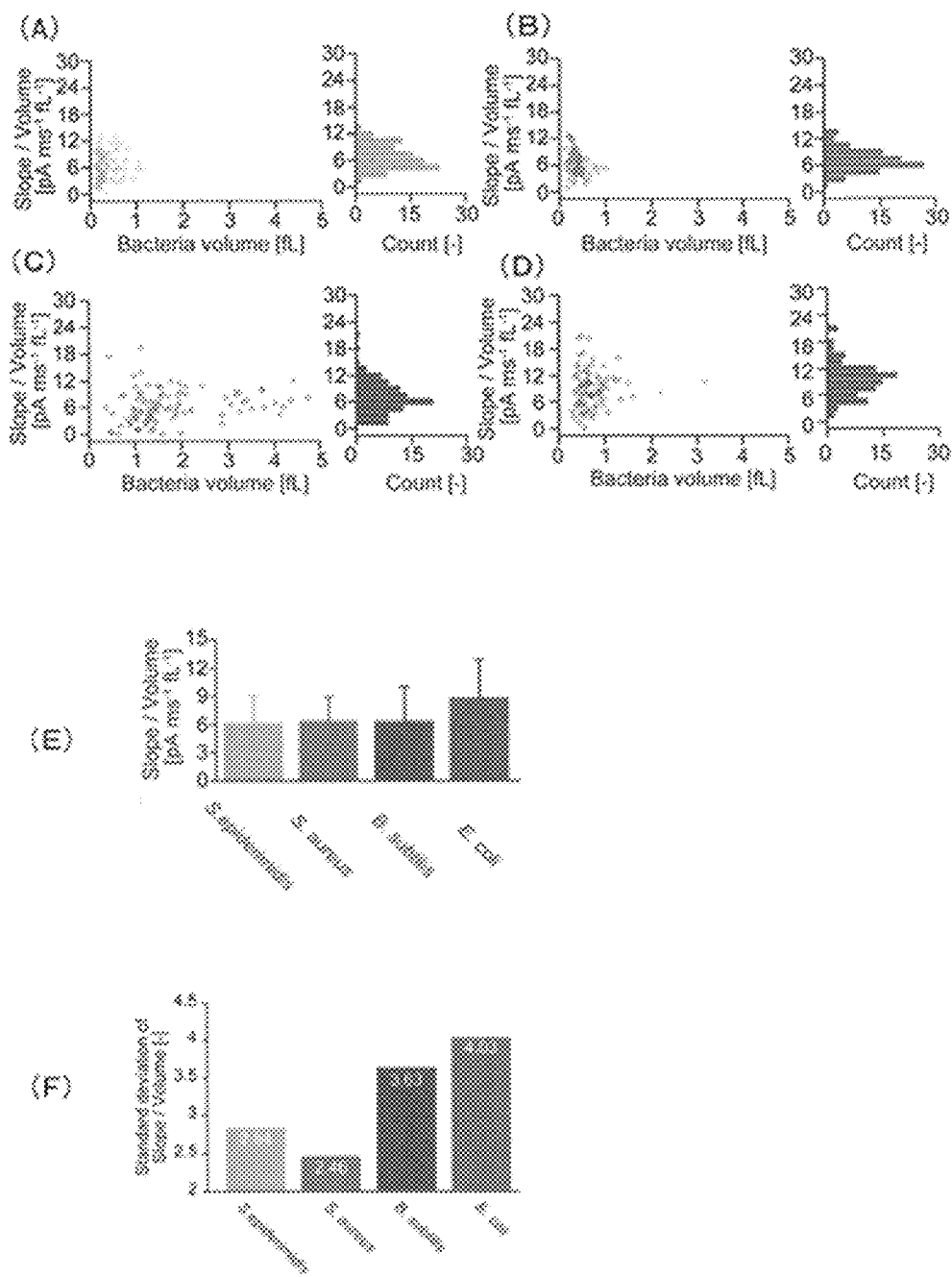
FIG. 14(A)-14(D) show plotting of samples (A) to (B) and a distribution of a (slope angle/sample volume) ratio.
FIG. 14(E) shows the (slope angle/sample volume) ratio for each of the samples.
FIG. 14(F) shows a variation (standard deviation) in the (slope angle/sample volume) ratio for each of the samples.
Figure 15:
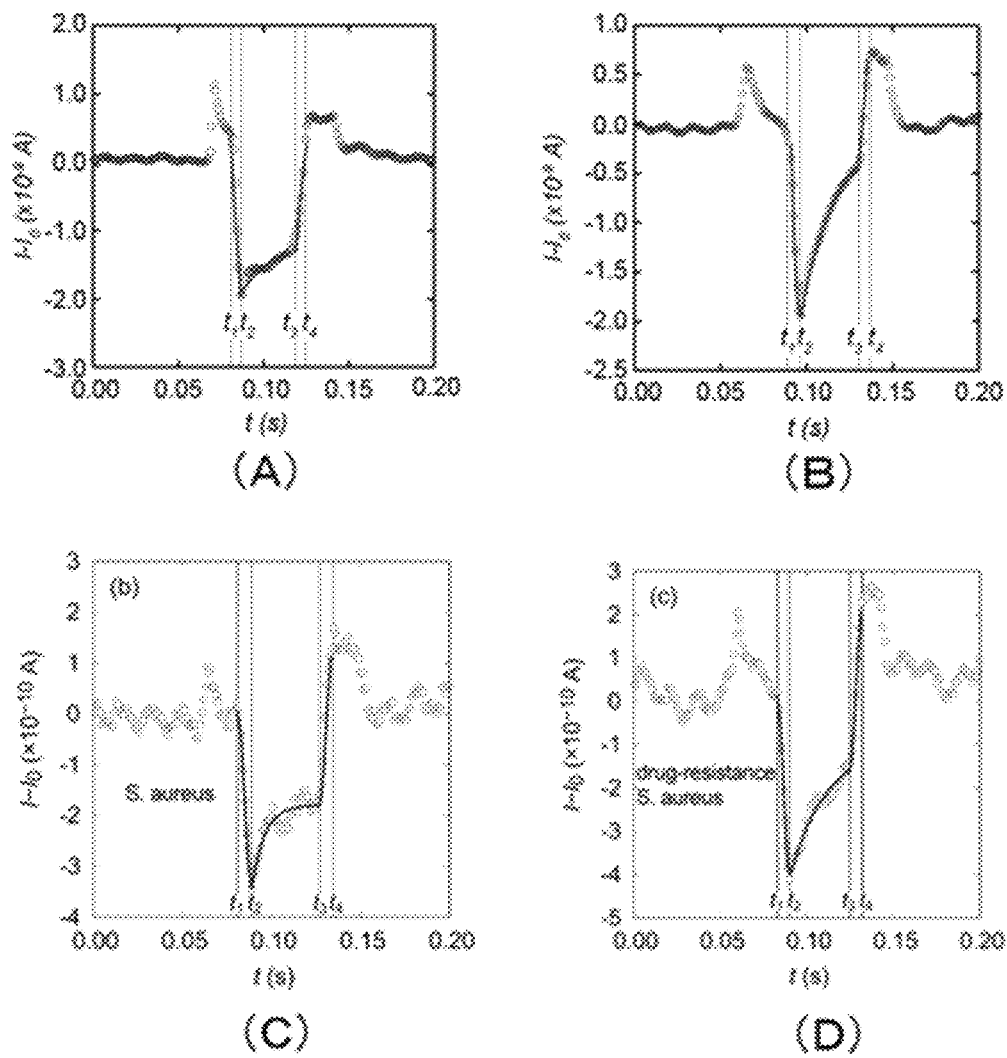
FIG. 15(A)-15(D) show measurement results for (A) *Bacillus subtilis*, (B) *E. coli*, (C) *Staphylococcus aureus*, and (D) vancomycin-resistant *Staphylococcus aureus* as measured in Example 6.

FIG. 14(A)-14(D) show plotting of samples (A) to (D) and a distribution of the (slope angle/sample volume) ratio, FIG. 14(E) shows the (slope angle/sample volume) ratio for each of the samples, and FIG. 14(F) shows a variation (standard deviation) in the (slope angle/sample volume) ratio for each of the samples. As shown in FIG. 14(E), it is difficult to identify samples of *S. epidermidis*, *S. aureus*, and *B. subtilis* in view of only the (slope angle/sample volume) ratio, but it was obvious that comparing the samples using the standard deviation (variation of the samples) and/or the volume distribution of the samples as well makes it possible to identify types of bacteria.

Additionally, as shall be apparent from the plotting shown in FIG. 14(A)-(D) and the standard deviation shown in FIG. 14(F), there was greater variation in the (slope angle/sample volume) ratio of the coccoid bacteria in FIGS. 14(A) and 14(B) than in that of the bacilliform bacteria in FIGS. 14(C) and 14(D). According to this result, determining the (slope angle/sample volume) ratio and the standard deviation makes it possible to identify whether a sample is of coccoid or bacilliform.

Furthermore, as shown in FIG. 14(E), the value of the (slope angle/sample volume) ratio for the gram-negative *E. coli* was greater than that for the gram-positive *Staphylococcus epidermidis*, *Staphylococcus aureus*, and *Bacillus subtilis*. The membrane thickness of cell surfaces of bacteria is approximately 10 nm for gram-negative bacteria and approximately 10-100 nm for gram-positive bacteria (Kenji Aoki, ed., Fundamental biology text series 4: Microbiology, fourth edition, Kagakudojin, 20 Sep. 2010 pp. 55-56). It is thought that the reason behind the value of the (slope angle/sample volume) ratio being greater for gram-negative bacteria is that perforations are more readily formed by the application of an electrical field by the drive unit in the cell membranes of gram-negative bacteria than in those of gram-positive bacteria due to the low thickness of the cell membranes in the former, allowing more substances in the cells to leak out in the movement part.
(Measurement 5 in which Device 1 is Used: Analysis in which Mathematical Model is Used)

Example 6

The bacteria listed below were used as samples.
(A) The same *Bacillus subtilis* as in Example 5.
(B) The same *E. coli* as in Example 5.
(C) The same *Staphylococcus aureus* as in Example 2.
(D) Vancomycin-resistant *Staphylococcus aureus* (ATCC 700699).

The value of the ion current was measured for each of the samples using the same procedure as in Example 2. FIG. 15(A)-15(D) are graphs showing measurement results for *Bacillus subtilis*, *E. coli*, *Staphylococcus aureus*, and vancomycin-resistant *Staphylococcus aureus*, respectively.

The actual measured values and constants shown in table 1 were then substituted into the mathematical model shown below, and $\gamma$ and $Q_0$ values were established at which least-squares fitting was achieved in the interval of $t_2<t<t_3$. The established values of $\gamma$ and $Q_0$ are also shown in table 1.

(Equation 4)

$$t_2 < t < t_3$$

$$I(t) = I_1 - \frac{4}{3}\pi a^3 \beta + \zeta(1 - e^{-\gamma(t-t_2)}) \quad (3)$$

$$\zeta = \frac{\beta Q_0}{\rho_0} \quad (4)$$

$$\beta = \frac{I_1 - I_2}{\Omega(t_2)} = \frac{3(I_1 - I_2)}{4\pi a^3} \quad (5)$$

TABLE 1

| | | Bacillus subtilis | E. coli | Staphylococcus aureus | Vancomycin-resistant Staphylococcus aureus |
|---|---|---|---|---|---|
| Actual measured values | $t_1$ (s) | 0.081 | 0.089 | 0.081 | 0.083 |
| | $t_2$ (s) | 0.087 | 0.096 | 0.089 | 0.090 |
| | $I_1$ (A) | $4.10 \times 10^{-10}$ | $-1.90 \times 10^{-10}$ | $9.25 \times 10^{-12}$ | $1.90 \times 10^{-11}$ |
| | $I_2$ (A) | $-1.95 \times 10^{-9}$ | $-2.03 \times 10^{-9}$ | $-3.45 \times 10^{-10}$ | $-4.10 \times 10^{-10}$ |
| Constants | a (μm) | 0.50 | 0.50 | 0.50 | 0.50 |
| | $\rho_0$ (C/m$^3$) | $9.63 \times 10^5$ | $9.63 \times 10^5$ | $9.63 \times 10^5$ | $9.63 \times 10^5$ |
| Calculated values Variables | $\beta$ (A/m$^3$) | $4.51 \times 10^9$ | $3.51 \times 10^9$ | $6.77 \times 10^8$ | $8.20 \times 10^8$ |
| | $\zeta$ (A) | $7.44 \times 10^{-10}$ | $1.90 \times 10^{-9}$ | $1.66 \times 10^{-10}$ | $3.05 \times 10^{-10}$ |
| | $Q_0$ (C) | $1.59 \times 10^{-13}$ | $5.20 \times 10^{-13}$ | $2.36 \times 10^{-13}$ | $3.58 \times 10^{-13}$ |
| | $\gamma$ (1/s) | 64.5 | 53.8 | 140.8 | 49.2 |

In table 1: $t_1$, $t_2$, $I_1$, and $I_2$ are actual measured values; a is a radius of the sample concluded on the basis of the size of the *Staphylococcus aureus*; $\rho_0$ is a charge density of electrolytes estimated from the 5×TBE buffer; and v, $\beta$, and $\zeta$ are calculated values obtained by substituting the values described previously into the mathematical model. The value of a is a constant value independent from the samples. $\gamma$ and $Q_0$ values at which least-squares fitting is achieved, said $\gamma$ and $Q_0$ values being established from measurement results by measuring the change in the ion current of the sample when the value of a is a constant value, are obtained as relative values having the value of a as a basis. The relative $\gamma$ and $Q_0$ values are the same when samples are the same, and differ when the samples are different. Therefore, there is no obstacle to identifying a sample even when the value of a is a constant value. As shall be apparent, it is possible for an actual size of the samples to be substituted for a when the size of the samples can be accurately measured.

As shown in table 1, the $\gamma$ and $Q_0$ values for achieving least-squares fitting clearly differ for *Bacillus subtilis, E. coli, Staphylococcus aureus*, and vancomycin-resistant *Staphylococcus aureus*, making it possible to identify different types of samples even in the case of determination in which the mathematical model was used.

Drug-resistant bacteria cannot be identified from a change in an ion current when a sample passes through a microchannel or a hole, and identification methods in which DNA is used have typically been used in such cases. However, through the method disclosed in the present specification, it was possible to identify vancomycin-resistant *Staphylococcus aureus* that had acquired drug resistance. It is known that the cell walls of *Staphylococcus aureus* thicken after these bacteria have acquired vancomycin resistance, and it is thought that the reason behind the ability to identify the samples is that the quantity of ions leaking from perforations is different when *Staphylococcus aureus* and vancomycin-resistant *Staphylococcus aureus* move through the movement part, making it possible to determine the difference in the quantity of ions that have leaked.

It was obvious that in the method for analyzing samples involving the use of the device for measuring the value of the ion current during passage through the measurement region, it was possible to perform more detailed analysis by determining the change over time in a quantity of ions including the quantity of ions that have leaked from the sample during passage through the measurement region, as described above.

INDUSTRIAL APPLICABILITY

Using the device and the analysis method of the present application makes it possible to identify not only sizes of samples but also types of samples. Therefore, the present invention is useful for the development of a measurement apparatus for accurately analyzing samples in business, research organizations, and the like.

REFERENCE SIGNS LIST

1: Device, 1-1: Device, 2: Substrate, 21: Etchable material, 22: Positive photoresist, 23: Substrate, 24: Through-hole, 25: First chamber member, 26: Second chamber member, 3: Movement part, 31: Sample injection part, 32: Sample recovery part, 33: First measurement channel, 34: Second measurement channel, 4: Measurement unit, 41: First electrode, 42: Second electrode, 43: Ammeter, 44: Voltage application means, 45: Variable resistor, 46: Fixed resistor, 5: Determination unit, 6: Storage unit, 7: Identification unit, 8: Drive unit, 81: Third electrode, 82: Fourth electrode, 83: Voltage application means, 9: Measurement unit, 91: Fifth electrode, 92: Sixth electrode, 93: Ammeter, 94: Power supply, 95: Ground, 96: Ground

The invention claimed is:

1. A method for analyzing samples contained in a sample solution by using a device for analyzing samples, wherein:
   the device for analyzing samples includes at least:
      a movement part through which a sample moves,
      a measurement region that is formed in the middle of the movement part, and
      a measurement unit that measures a value of an ion current when the sample passes through the movement part,
   the method for analyzing samples includes at least:
      a measurement step for measuring the value of the ion current when the sample passes through the movement part; and
      an analyzing step for analyzing a change over time in a quantity of ions in the sample solution and ions that have leaked from the sample during movement of the sample through the measurement region from the value of the ion current when the sample passes through the measurement region, and
      the analyzing step comprises determining, from the measured value of the ion current, at least a slope of a portion in which the ion current has greatly changed when a sample has passed through the measurement region.

2. The method for analyzing samples according to claim 1, wherein:
   the slope is a slope of a line connecting a first point and a second point, where
      the first point corresponds to a midpoint of a first intersecting point and a second intersecting point, the first intersecting point being an intersecting point between a baseline and a large downward change of the ion current when the sample has entered the measurement region, and the second intersecting point being an intersecting point between the baseline and a large upward change of the ion current when the sample has exited the measurement region, the baseline being an approximating line of the ion current when the sample has passed through a portion of the movement part other than the measurement region, and the second point corresponds to a point at which the ion current deviates from an approximate line which approximates a large upward change in the ion current and passes through the second intersecting point; or the slope is a slope of a line connecting a third point and a fourth point, where the third point is a point at which the ion current deviates from an approximate line, which approximates a large downward change in the ion current and passes through a third intersecting point at which the baseline intersects a large downward change in the ion current when the sample has entered the measurement region, and the fourth point is a point at which the ion current deviates from an approximate line which approximates a large upward change in the ion current and passes through a fourth intersecting point at which the baseline intersects a large upward change in the ion current when the sample has exited the measurement region.

3. The method for analyzing samples according to claim 2, wherein
the analyzing step involves also determining a standard deviation of the slope and/or a volume distribution of the sample.

4. The method for analyzing samples according to claim 3, furthermore including
an identification step for comparing the slope, the standard deviation of the slope angle, and/or the volume distribution of the sample determined in the analyzing step and a slope, a standard deviation of the slope angle, and/or volume distribution of a sample determined from pre-measured values of ion currents of various samples, to identify a type of the sample.

5. The method for analyzing samples according to claim 2, furthermore including
an identification step for comparing the slope determined in the analyzing step and a slope determined from pre-measured values of ion currents of known samples, to identify a type of the sample.

6. The method for analyzing samples according to claim 2, wherein
the analyzing step involves determining a value obtained by dividing the slope by a sample volume.

7. A method for analyzing samples contained in a sample solution by using a device for analyzing samples, wherein:
the device for analyzing samples includes at least:
a movement part through which a sample moves,
a measurement region that is formed in the middle of the movement part, and
a measurement unit that measures a value of an ion current when the sample passes through the movement part, the method for analyzing samples includes at least:
a measurement step for measuring the value of the ion current when the sample passes through the movement part; and
an analyzing step for analyzing a change over time in a quantity of ions in the sample solution and ions that have leaked from the sample during movement of the sample through the measurement region from the value of the ion current when the sample passes through the measurement region, and the analyzing step involves using a mathematical model represented by:

$$t_2 < t < t_3$$
$$I(t) = I_1 - \frac{4}{3}\pi a^3 \beta + \zeta(1 - e^{-\gamma(t-t_2)}) \quad (3)$$

$$\zeta = \frac{\beta Q_0}{\rho_0} \quad (4)$$

$$\beta = \frac{I_1 - I_2}{\Omega(t_2)} = \frac{3(I_1 - I_2)}{4\pi a^3} \quad (5)$$

where, in the mathematical model, $I(t)$ represents an ion current at time $t$, $I_1$ represents an ion current at $t_1$, and $I_2$ represents an ion current at $t_2$; $\beta$ represents a ratio of a difference between $I_1$ and $I_2$ to a sample volume; value $\Omega$ represents a volume of the sample entering the movement part, $a$ represents a radius of the sample, $\zeta$ represents an ion current produced by an electric charge leaking from the sample, $\gamma$ represents a speed constant for ions leaking from the sample, $\rho_0$ represents a charge density of a buffer solution, and $Q_0$ represents a charge included in the sample.

8. A device for analyzing samples contained in a sample solution, comprising:
a movement part through which a sample moves;
a measurement region that is formed in the middle of the movement part;
a measurement unit that measures a value of an ion current when the sample passes through the movement part; and
a determination unit that analyzes a change over time in a quantity of ions of the sample solution containing the sample ions that have leaked from the sample during movement of the sample through the measurement region from the value of the ion current when the sample passes through the measurement region, and
the determination unit determines, from the measured value of the ion current, at least a slope of a portion in which the ion current has greatly changed when a sample has passed through the measurement region.

9. The device according to claim 8, wherein:
the slope is a slope of a line connecting a first point and a second point, where
the first point corresponds to a midpoint of a first intersecting point and a second intersecting point, the first intersecting point being an intersecting point between a baseline and a large downward change of the ion current when the sample has entered the measurement region, and the second intersecting point being an intersecting point between the baseline and a large upward change of the ion current when the sample has exited the measurement region, the baseline being an approximating line of the ion current when the sample has passed through a portion of the movement part other than the measurement region, and the second point corresponds to a point at which the ion current deviates from an approximate line which approximates a large upward change in the ion current and passes through the second intersecting point; or the slope is a slope of a line connecting a third point and a fourth point, where the third point is a point at which the ion current deviates from an approximate line, which approximates a large downward change in the ion current and passes through a third intersecting point at which the baseline intersects a large downward change in the ion current when the sample has entered the measurement region, and the fourth point is a point at which the ion current deviates from an approximate line which approximates a large upward change in the ion current and passes through a fourth intersecting point at which the baseline intersects a large upward change in the ion current when the sample has exited the measurement region.

10. The device according to claim 9, wherein
the determination unit also determines a standard deviation of the slope and/or a volume distribution of the sample.

11. The device according to claim 10, furthermore including:
a storage unit that stores a slope angle determined from a pre-measured value of an ion current of a known sample, a standard deviation of the slope, and/or a volume distribution of the known sample; and
an identification unit that compares the slope angle, the standard deviation of the slope angle, and/or the volume distribution of the sample determined by the determination unit and the slope angle, the standard deviation of the slope angle, and/or the volume distribution of the known sample stored in the storage unit to identify a type of sample.

12. The device according to claim 11, wherein
the determination unit determines a value obtained by dividing the slope by sample volume.

13. The device according to claim 10, wherein
the determination unit determines a value obtained by dividing the slope by sample volume.

14. The device according to claim 10, wherein
the device includes a drive unit for forming an electrical field in the movement part, the drive unit having a voltage source for changing a magnitude of the electrical field.

15. The device according to claim 9, furthermore including
a storage unit that stores at least a slope determined from a pre-measured value of an ion current of a known sample, and
an identification unit that compares the slope determined by the determination unit and the slope stored in the storage unit to identify a type of the sample.

16. The device according to claim 15, wherein
the determination unit determines a value obtained by dividing the slope by sample volume.

17. The device according to claim 9, wherein
the determination unit determines a value obtained by dividing the slope by sample volume.

18. The device according to claim 9, wherein
the device includes a drive unit for forming an electrical field in the movement part, the drive unit having a voltage source for changing a magnitude of the electrical field.

19. The device according to claim 8, wherein
the device includes a drive unit for forming an electrical field in the movement part, the drive unit having a voltage source for changing a magnitude of the electrical field.

20. A device for analyzing samples contained in a sample solution, comprising:
a movement part through which a sample moves;
a measurement region that is formed in the middle of the movement part;
a measurement unit that measures a value of an ion current when the sample passes through the movement part; and
a determination unit that analyzes a change over time in a quantity of ions of the sample solution containing the sample ions that have leaked from the sample during movement of the sample through the measurement region from the value of the ion current when the sample passes through the measurement region, and
the determination unit uses a mathematical model represented by:

$$t_2 < t < t_3$$

$$I(t) = I_1 - \frac{4}{3}\pi a^3 \beta + \zeta(1 - e^{-\gamma(t-t_2)}) \quad (3)$$

$$\zeta = \frac{\beta Q_0}{\rho_0} \quad (4)$$

$$\beta = \frac{I_1 - I_2}{\Omega(t_2)} = \frac{3(I_1 - I_2)}{4\pi a^3} \quad (5)$$

where, in the mathematical model, I(t) represents an ion current at time t, $I_1$ represents an ion current at $t_1$, and $I_2$ represents an ion current at $t_2$; $\beta$ represents a ratio of a difference between $I_1$ and $I_2$ to a sample volume; value $\Omega$ represents a volume of the sample entering the movement part, a represents a radius of the sample, $\zeta$ represents an ion current produced by an electric charge leaking from the sample, $\gamma$ represents a speed constant for ions leaking from the sample, $\rho_0$ represents a charge density of a buffer solution, and $Q_0$ represents a charge included in the sample.

* * * * *